(12) United States Patent
Manders (10) Patent No.: US 11,920,412 B2
(45) Date of Patent: Mar. 5, 2024

(54) METHODS AND APPARATUS FOR COILED TUBING INSPECTION BY ULTRASOUND (71) Applicant: DarkVision Technologies Inc., North Vancouver (CA)

(72) Inventor: Graham Manders, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 883 days.

(21) Appl. No.: 16/986,023

(22) Filed: Aug. 5, 2020

(65) Prior Publication Data

US 2021/0040838 A1 Feb. 11, 2021

(30) Foreign Application Priority Data

Aug. 6, 2019 (GB) ...................................... 1911201

(51) Int. Cl.
*E21B 19/22* (2006.01)
*B06B 1/06* (2006.01)
*E21B 47/002* (2012.01)
*G01N 29/06* (2006.01)
*G01N 29/26* (2006.01)
*G01N 29/28* (2006.01)

(52) U.S. Cl.
CPC ............ *E21B 19/22* (2013.01); *B06B 1/0611* (2013.01); *E21B 47/0025* (2020.05); *G01N 29/0654* (2013.01); *G01N 29/262* (2013.01); *G01N 29/28* (2013.01); *B06B 2201/73* (2013.01); *G01N 2291/023* (2013.01); *G01N 2291/0289* (2013.01); *G01N 2291/044* (2013.01); *G01N 2291/106* (2013.01)

(58) Field of Classification Search
CPC ... E21B 19/22; E21B 47/0025; B06B 1/0611; B06B 2201/76; G01N 29/0654; G01N 29/1262; G01N 29/28; G01N 2291/023; G01N 2291/0289; G01N 2291/044; G01N 2291/106
USPC .......................................................... 73/602
See application file for complete search history.

(56) References Cited

U.S. PATENT DOCUMENTS 4,404,853 A * 9/1983 Livingston ............ E21B 17/006
73/628
4,475,399 A * 10/1984 Livingston ............. G01N 29/26
73/637

(Continued)

FOREIGN PATENT DOCUMENTS

JP 2013236973 A 11/2013
WO WO-03058545 A1 * 7/2003 ............. E21B 19/22

(Continued)

OTHER PUBLICATIONS

Combined Search and Examination Report received for GB application No. 2012204.0, dated Dec. 23, 2020, 5 pages.

*Primary Examiner* — Lisa M Caputo
*Assistant Examiner* — Rose M Miller (57) ABSTRACT

A device and method used for inspecting and measuring coiled tubing, production tubing or drill pipe as it enters the well. Defects such as internal and external wall loss, cracking and deformation can be detected and quantified. The axial motion of the tubing can be measured allowing for depth measurements that are more accurate and reliable than what can be obtained using an encoder wheel system.

20 Claims, 9 Drawing Sheets

(56) References Cited

U.S. PATENT DOCUMENTS

| | | | | |
|---|---|---|---|---|
| 4,487,072 | A * | 12/1984 | Livingston | G01N 29/40 |
| | | | | 73/628 |
| 4,523,468 | A * | 6/1985 | Derkacs | G01N 29/262 |
| | | | | 73/598 |
| 4,567,747 | A * | 2/1986 | Matay | G01N 29/30 |
| | | | | 73/598 |
| 5,303,592 | A | 4/1994 | Livingston | |
| 5,914,596 | A | 6/1999 | Weinbaum | |
| 7,080,557 | B2 | 7/2006 | Adnan | |
| 8,972,206 | B2 * | 3/2015 | Shaffer | G01N 29/069 |
| | | | | 73/622 |
| 11,116,481 | B2 * | 9/2021 | Matsumoto | A61B 8/4254 |
| 2004/0050166 | A1 * | 3/2004 | Batzinger | G01N 29/069 |
| | | | | 73/622 |
| 2013/0283918 | A1 * | 10/2013 | Habermehl | G01N 29/069 |
| | | | | 73/622 |
| 2014/0126330 | A1 | 5/2014 | Shampine et al. | |
| 2014/0207390 | A1 * | 7/2014 | Zheng | G01N 29/043 |
| | | | | 702/34 |
| 2019/0353025 | A1 | 11/2019 | Alshehri et al. | |

FOREIGN PATENT DOCUMENTS

| | | |
|---|---|---|
| WO | 2018191819 A1 | 10/2018 |
| WO | 2019125354 A1 | 6/2019 |

\* cited by examiner

70 Deploy coiled tubing thru imaging device and into wellbore

71 Use first ultrasound array to capture scan lines of a cross-section of the coiled tube.

72 Use second ultrasound array to capture scan lines

73 Calculate auto correlation between first and second images

74 Calculate movement between first and second images based on auto correlation

75 Determine instantaneous speed change based on movement and times of images

76 Integrate instantaneous speeds to calculate deployed length of coiled tube

78 Image processing to determine damage to CT

79 Create 3D model of coiled tubing for analysis

METHODS AND APPARATUS FOR COILED TUBING INSPECTION BY ULTRASOUND

CROSS-REFERENCE TO RELATED APPLICATION

This application claims the benefit of and priority to United Kingdom Application No. GB 1911201.0, filed on Aug. 6, 2019, the disclosure of which is incorporated herein by reference in its entirety.

TECHNICAL FIELD

The present disclosure relates generally to inspection and measurement of coiled tubing, production tubing, and drill pipe useful in the oil and gas industry, particularly inspection of damage to the tubing or pipe.

BACKGROUND

In oil and gas operations, tools are connected to and deployed into a wellbore using a variety of wireline or tubing systems. Coiled tubing (CT) is deployed into well on large spools mounted on a truck. It is desirable to inspect the CT while it is being deployed in the field for damage before and after deployment.

A damaged CT inserted into a wellbore is prone to breaking thus creating an inoperable well, tubular blowout and expensive fishing operation. Additionally, while in the wellbore the CT is subject to caustic environments and surface collisions that potentially damage the surface of the CT, which damage either needs to be caught prior to reloading the truck or when deploying on the next job.

It is currently difficult and expensive to inspect the CT in a warehouse before deployment in the field. For example, there are typically several kilometers of tubing that must be unraveled somewhere prior to inspection. It is convenient and cost effective to inspect the CT during real-time deployment to evaluate its condition before and after deployment. The evaluation may be used to extend the lifetime of the CT because it is not discarded at some statistically estimated lifetime.

Additionally an accurate real-time measurement of the depth of a tool deployed on CT is important, so that the tool operation can occur at the correct point in the well. Depth measurement of the coil is typically done with an encoder wheel on the injector or gooseneck engaged with the surface of the CT. However such depth measurements are problematic and large errors are common (10's of meters over a 5000 m well), as the technique suffers from buildup of dirt, debris and corrosion that causes wheel diameter to change or the wheel to slip or bounce.

Existing CT inspection tools use magnetic sensing to detect fluctuations in magnetic field that are interpreted as damage. For example, Schlumberger's Coilscan pipe inspection uses magnetic flux leakage to detect damage and thickness while encoder wheels measure distance.

While acoustic sensing has been disclosed (e.g. U.S. Pat. No. 7,080,557 filed 7 Apr. 2004 "Method and apparatus for inspecting a tubular using acoustic signals" to Schlumberger it is not normally used due to the surface detritus and problems with ensuring a transmission medium between sensor and CT surface.

BRIEF SUMMARY

To address the shortcomings of the current tools, a new coiled tubing inspection device is provided that is capable of improved imaging for defects in the CT and depth measurement. A device is provided comprising one or more high-resolution array(s) able to detect small corrosion pitting and small cracks before they become a problem.

According to a first aspect there is a method of operating coiled tubing (CT) at a wellsite comprising the steps of providing an imaging device having at least two ultrasound arrays axially spaced-apart and facing radially-inward towards the CT; running the CT through a cavity in the imaging device and into a wellbore; capturing a first image of the CT with a first of the ultrasound arrays; capturing a second image of the CT with a second of the ultrasound arrays at a later time than the first image; comparing the first and second image to determine the amount of shift of identical features in the images in order to estimate an amount of movement of the CT through the imaging device.

According to a second aspect there is a method of operating coiled tubing (CT) at a wellsite comprising the steps of providing an imaging device having an ultrasound array facing radially inward towards and divergently focused at the surface of the CT; running the CT through a cavity in the imaging device and into a wellbore; capturing a first image of the CT with the ultrasound array in a first frame; capturing a second image of the CT with the ultrasound array at a subsequent frame, wherein the first and second image are partly overlapping; comparing the first and second image to determine the amount of shift of the same features in the images and in order to estimate an amount of movement of the CT through the imaging device.

The method may process the images to identify damage to a surface of the CT.

The method may comprise creating a seal between the CT and an opening in the imaging device to reduce leakage of coupling fluid from the cavity.

According to a third aspect there is an imaging device for imaging coiled tubing (CT) comprising: a housing having two openings at opposing ends and a cavity therebetween, the opening and cavity arranged to axially accommodate and pass through a length of coiled tubing; at least two radial ultrasound arrays facing radially-inward towards the cavity, wherein the arrays are axially spaced-apart from each other along the cavity.

According to a fourth aspect there is an imaging device for imaging coiled tubing (CT) comprising: a housing having two openings at opposing ends and a cavity therebetween, the opening and cavity arranged to axially accommodate and pass through a length of coiled tubing; a radial ultrasound array facing radially-inward towards the cavity and divergently focused at the surface of the CT.

The device may comprise a third radial array facing radially-inwards towards the cavity and perpendicular to the longitudinal axis of the cavity.

The arrays may be phased arrays, the device further comprising a driving circuit for beam steering elements of the third array such that beam is angled off center relative to the surface of the tubing for detecting axial cracks.

The device may comprise a driving circuit for beam steering elements of the arrays towards the CT.

At least one of the openings may comprise sealing means to engage a surface of the coiled tubing to reduce leakage of coupling fluid from the cavity.

The processor may compare first and second images to determine the amount of shift of the same features in the images and thus estimate an amount of movement of the CT through the imaging device.

The processer may process the images to identify damage on the CT.

The processor may capture a first image of the CT with the ultrasound array in a first frame; capture a second image of the CT with the ultrasound array at a subsequent frame, wherein the first and second image are partly overlapping; and then compare the first and second image to determine the amount of shift of the same features in the images and in order to estimate an amount of movement of the CT through the imaging device.

Further aspects of the disclosure are set out below and in the appended claims. Thus, various embodiments of the disclosure enable the device to image conduits, such as pipes and wells over long distances, providing the image data for real-time monitoring or subsequent visualization.

BRIEF DESCRIPTION OF THE DRAWINGS

Various objects, features, and advantages of the disclosure will be apparent from the following description of embodiments of the disclosure, as illustrated in the accompanying drawings. The drawings are not necessarily to scale, emphasis instead being placed upon illustrating the principles of various embodiments of the disclosure.

Similar reference numerals indicate similar components having the following key.

2 coiled tubing (CT);
3 coiled tubing vehicle;
4 gooseneck;
5 injector head;
6 Wellhead cross-over flange
7 stripper assembly
8 well head
10 imaging device;
11 scan line;
12 first acoustic array;
13 second acoustic array;
14 third acoustic array;
15 acoustic aperture;
16 body;
18 operations site;
19 remote visualization computer system
20 device processing circuit;
21 transducer element;
22 tracked feature;
23 feature shift
35 instruction memory; and
37 non-volatile compressed image storage.

DETAILED DESCRIPTION

Figure 1:
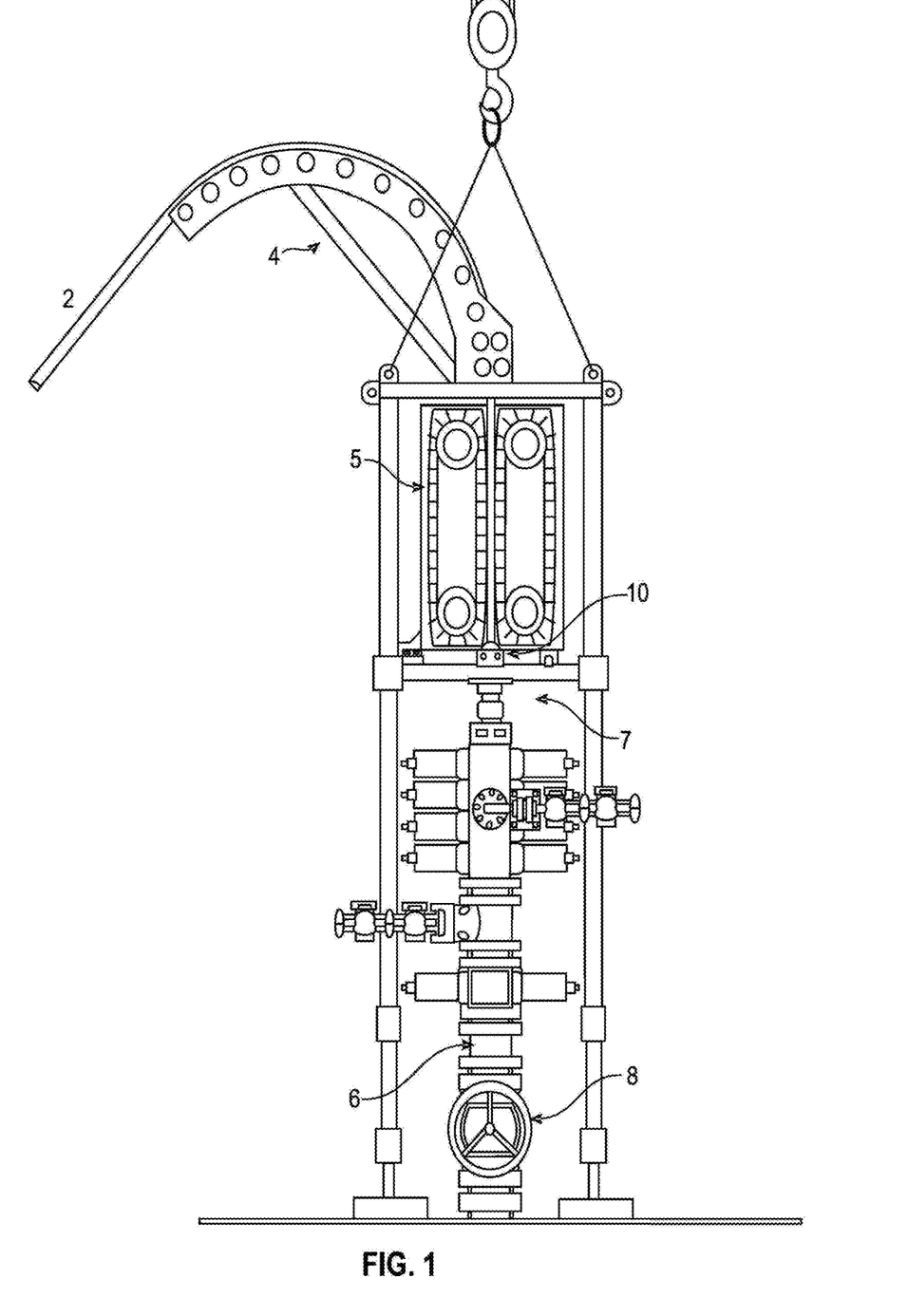
FIG. 1 is an illustration of coiled tubing deployment at a wellbore site with an ultrasound imaging device in accordance with one embodiment of the disclosure.

With reference to the accompanying figures, devices and methods are disclosed for capturing, processing, and storing ultrasound reflections from a coiled tube by one or more ultrasound transducer arrays. FIG. 1 shows an operations site above a wellbore, in which coiled tubing (CT) is being deployed over a gooseneck, through an in1agine device, injector head, stripper and into the wellbore.

Figure 2:
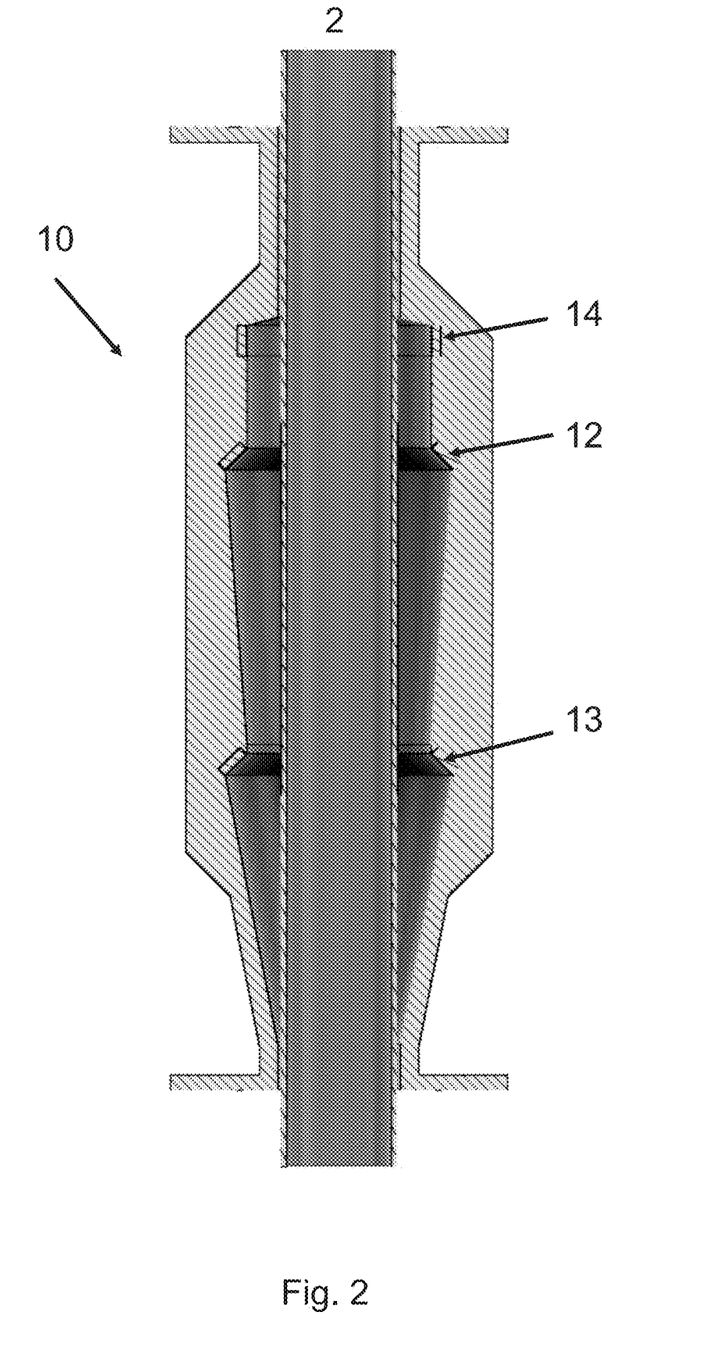
FIG. 2 is a cross-section of a CT imaging device enveloping a coiled tube.

In accordance with one embodiment of the present disclosure, there is provided an imaging device for imaging a coiled tube 2, as illustrated in FIG. 2. The imaging device 10 generally comprises at least one ultrasound transducer array, but optionally there is a first transducer array 12, a second transducer array 13, and a third transducer array 14.

The coiled tubing is driven into and out of the wellbore using the injector head. An injector head has a curved guide beam on top called a gooseneck which threads the coil into the injector body. Below the injector is the stripper, which contains rubber pack off elements providing a seal around the tubing to isolate the well's pressure and remove detritus and fluids that get stuck on the CT.

The imaging device may be located uphole of the stripper to capture images of the clean CT. The images can be processed to determine the amount of deployment (depth) and damage on the CT.

As shown in the embodiment of FIG. 2, the imaging device may comprise two angled arrays 12 and 13, shaped as a frustoconical ring, with elements facing radially inward and angled axially up or down. These arrays are designed to reflect off surface features of the CT but do not penetrate very deep. As shown in the alternative layout of FIG. 3, the wavefront of the angled arrays is divergent, i.e. unfocussed and sonifies a large area of the CT surface.

These arrays are used for creating high resolution acute angle surface map, detecting circumferential cracks, and measuring depths of deployment of the CT. The depth measurement using ultrasound is possible with a high-resolution array that can detect enough texture detail to precisely register two image frames and then detect movement of textures details between frames. The array(s) may have 256-1024 scan lines from 256-1024 elements, optionally operating at 5 MHz. The frame rate may by 50-200 fps, optionally more than 150 fps in order to image the CT at a high enough resolution to capture cracks and identify features for comparison.

There may be a third array 14 that is generally perpendicular, inward facing towards the surface of the CT. This array is used for axial crack detection, thickness measurement, hole detection, tubing geometry (partial buckling, kink etc.), and determining material properties, such as hardness, fatigue, strength, tensile strain, bending strain or stiffness.

As shown in FIG. 1 the imaging device 10 may be located uphole of the stripper 7 and injector head 5. It may be connected in line with or integral with these other wellsite components. At opposing ends of the imaging device housing, openings permit entry of the CT into the device's cavity in a sealed fashion. Each of the openings has a sealing bearing that engages the CT in order to take any loads and reduce leakage of acoustic coupling fluid from inside the device. The fluid provides a coupling medium for the ultrasound waves to efficiently reach the CT.

Although the fluid is under low pressure, some leakage or wetting of the CT occurs. This lost fluid is topped up by a pump and fluid reservoir.

Angled Array

Optionally, plural elements of the radial array are electrically selected, and beam steered to provide multiple scan lines to sonify multiple areas in a frame. As the CT moves axially past the arrays, multiple frames redundantly capture areas to image a large section of the CT surface.

The transducer directs acoustic waves, towards the surface at a high angle of incidence such that the majority of the reflected wave is from CT surface features, rather than depth into the tubing. The present device and method are most useful to image a flat surface, at least flat along the direction of the scan line. The optimal system design and operating settings is a tradeoff of deployment speed, wavelength, focus, sonified area, frame rate, overlap, and angle of incidence. In the following discussion, various embodiments and ranges are given based on practical parameters, such as Signal to Noise ratio and feature resolution.

Figure 5:
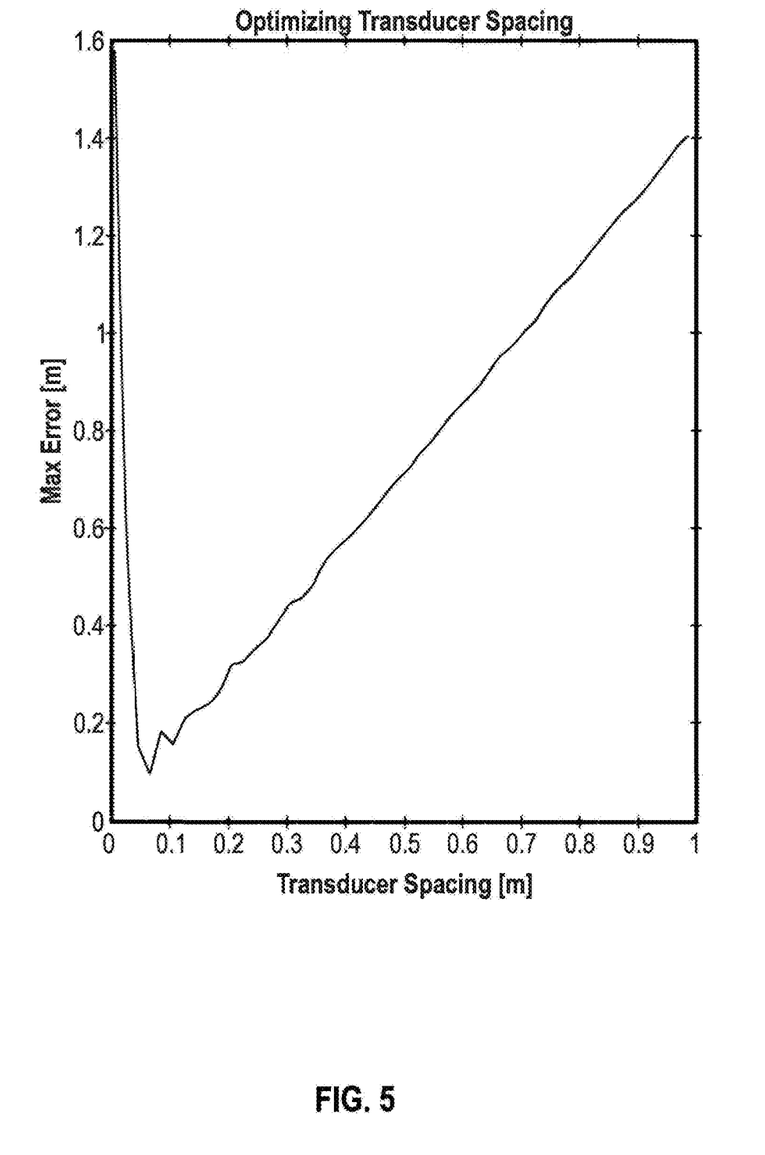
FIG. 5 is a graph of maximum depth error vs axial spacing of two arrays, over 3000 m deployment.

The device may use high angle of incident arrays for detecting circumferential cracks, creating high resolution surface texture maps (from the time of flight) and for measuring depth. Using two arrays allows for more accurate depth measurement because the error in registering the frames is small compared to the spacing of the arrays. FIG. 5 shows the optimization of transducer spacing to minimize depth measurement error and shows the trade-off between angled array spacing and depth measurement error. At the optimum transducer array spacing of 0.07 to 0.15 m apart, an accumulated error of 0.2 m over a 3000 m deployment is achievable.

The angle of incidence is optionally greater than the critical angle, determined by the speed of sound of the coupling fluid. The angle of incidence (measured from the surface normal, towards the longitudinal axis) may be set at 20 to 70°. Surface features in the reflected waves can be discriminated based on their Time of Flight (TOF), provided that the sampling period of the electronics is shorter than half of the separation in arrival time of pulses. Thus, a higher angle of incidence and higher sampling rate provides a higher longitudinal resolution, but with less signal strength. The inventors have found that a desirable angle of incidence is between 50-70°.

In most uses, the wave frequency is ultrasonic, operating between 1 and 10 MHz. Higher frequencies (shorter wavelengths) are able to discriminate finer features on the surface by returning distinct reflections from each feature. This does require greater sampling rate, data processing and data memory. The frequency can be manually or automatically changed based on the velocity of the tubing and/or coupling fluid.

The number of individual elements in the transducer array(s) affects the resolution of the generated images. Typically, each transducer array is made up of 32 to 2048 elements, optionally 128 to 1024 elements. The use of a relatively large number of elements generates a fine resolution image of the well in the plane of the array. The transducers may be piezoelectric, such as the ceramic material, PZT (lead zirconate titanate). Such transducers and their operation are well known and commonly available. Circuits to drive and capture these arrays are also commonly available.

The number of transducer elements, their pitch, and driving frequency 1 affect the imaging quality. In acoustic transducers, a useful rule is that the pitch should be in the range of $\lambda/2$ and $\lambda$, to minimize grating lobes. Thus, in one embodiment, there may be 128 elements, spaced 300 μm (equal to $\lambda$) apart, driven at 5 MHz in water.

Figure 3:
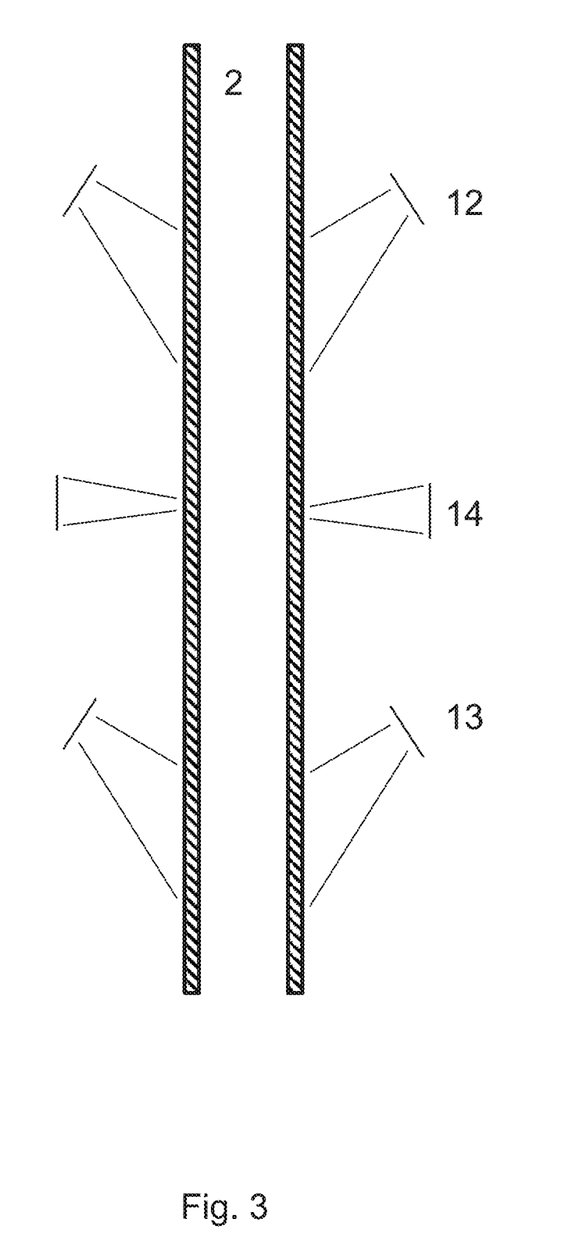
FIG. 3 is an illustration of beam focusing for each of three radial ultrasound arrays.
Figure 4:
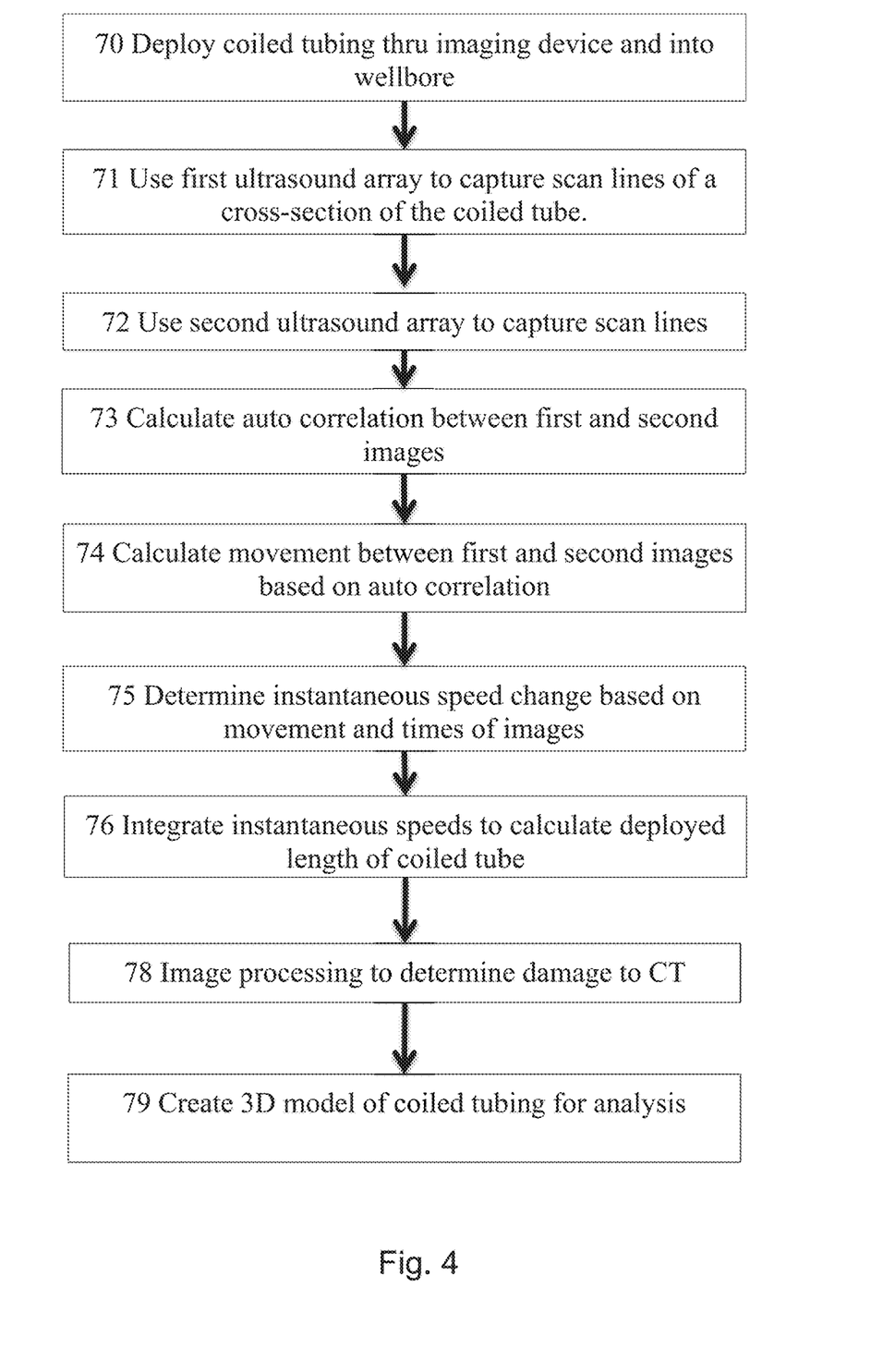
FIG. 4 is a flowchart for determining depth of deployed coiled tube.

In an embodiment of the present disclosure, as shown in FIG. 3, the transducer elements radially inward and axially to create a high angle of incidence, such as 50-70°. Thus, the majority of reflections correspond to surface features protruding or recessed from the otherwise flat surface of the CT. As the CT is moved axially through the imaging device, in either a downhole or uphole direction, the cone-shaped transducer continually captures axially overlapping areas on the surface of the CT, which are stitched together with radially adjacent scan lines to generates a 2D image of the CT surface.

Figure 8A:
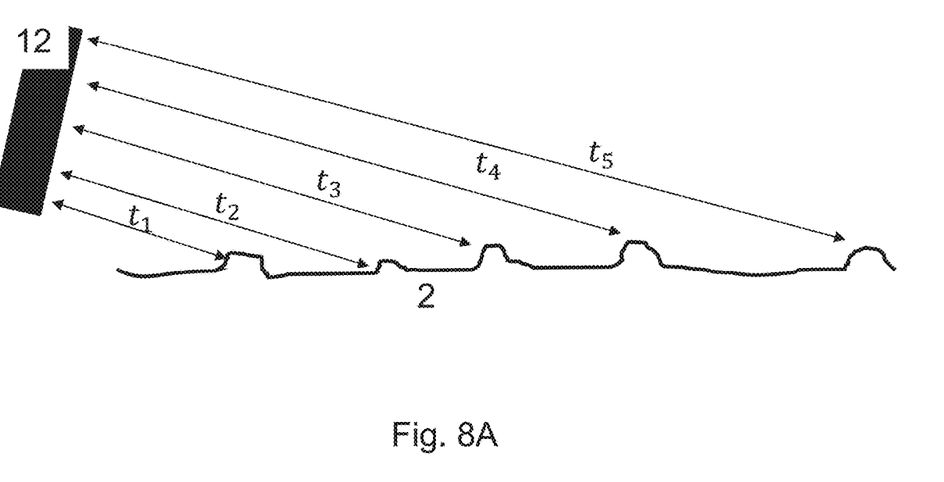
FIG. 8A is an illustration of individual reflections in space and their time of flight.

In contrast to prior systems, the arrays 12, 13 do not focus the wave at the surface of the CT but rather spreads the wave energy over an area (see FIGS. 3 and 8A). The intention is to capture multiple surface features in a single scan line. Optionally, the geometry of the lens or reflector is arranged to emit a defocused, or collimated wave to the surface.

Figure 7:
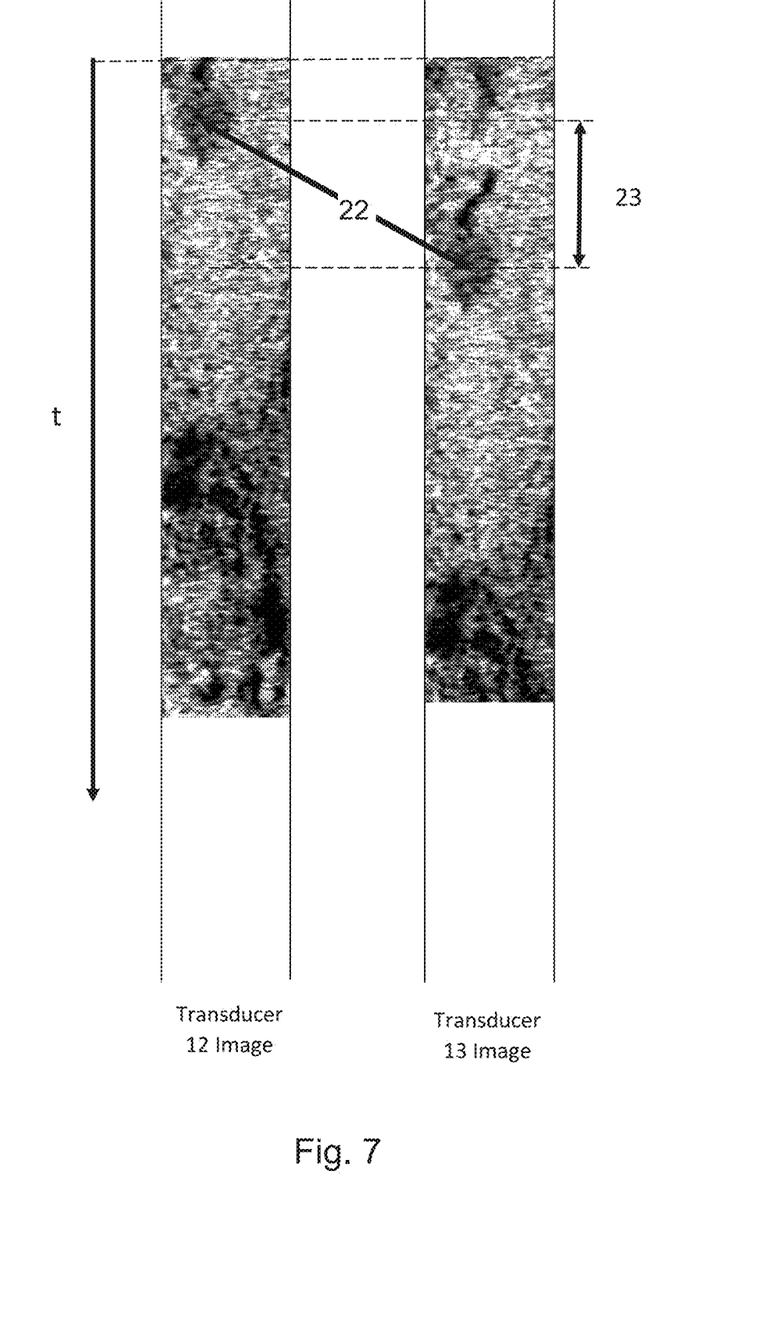
FIG. 7 is a side-by-side comparison of images for the same defocused are taken from two spaced-apart ultrasound transducers.

FIG. 7 shows a single frame of 50 scan lines from array 12. Here, each scan line provides 1D surface features (i.e. not radial depth data). There are clearly features of a particular pattern present. The second transducer 13 captures a similar image with some overlapping areas. Some identical surface features 22 and patterns are present but shifted down. The amount of shift 23 corresponds to the amount of movement of the CT and the spacing between the two arrays. In the extreme case, there is only one array with zero spacing, and thus the shift of features is a measure of distance moved by the CT between successive frames for the single array.

As shown in FIG. 8A, a single wave front is emitted for one scan line at a steep angle towards the surface at a defocused area of CT 2. Each surface feature reflects back a small pulse with time of flight t1-5. The Time of Flight to of each reflected pulse determines the distance from the transducer. The amplitude of each reflected pulse increases with the size of the feature normal to the transducer, attenuated by the distance travelled in the fluid. FIG. 8A shows the TOF (t1-t5) of various features. The reflection amplitudes captured by the transducer are plotted with their TOF (t1-t5) to create the signal graph of FIG. 8B, including added noise signals n1-n3.

Thus, features near the element return reflections before those further away, and via the TOF conversion, the processor can compute the locations of reflections relative to the sonified area. The axial location (relative to the transducer) of a feature i depends of its TOF and the constant angle of incidence β/2 by:

$$Location_i = TOF_i \times \cos\beta/2$$

Generating and Capturing Reflections

The CT is deployed through the imaging device, being imaged one frame of plural scan lines, every 5-50 millimeters as it moves. Each frame partially overlaps the sonified area in the previous frame to capture features redundantly.

The area sonified by the directed wave from array 12, 13 is large compared to the movement of the CT in that time, and presently captures multiple surface features per frame. The transmitted wavefront may be called divergent or defocused at the sonified area. The area receiving the coherent wavefront is larger than the transducer elevation. The sonified area may be 5-50 mm in the axial direction of the CT with a radial width which is the circumference of the CT divided by the number of scan lines. Larger areas envelope more features but spread the energy more.

A curvature of the lens or reflector determines the divergence of the beam. The curvature may be convex, concave, or flat, provided that the focal point is not the inner surface of the well or pipe. The skilled person will appreciate that focusing also depends on the relative speed of sound from the lens material to fluid.

In diverging embodiments, the wavefront may have an effective focal point behind the transducer element, i.e. further from the longitudinal axis than the array elements.

In converging embodiments, the wavefront may have a focal point inward of the surface which then spreads out to sonify a larger area at the surface.

A flat transducer can also sonify a desired area of sufficient size, where the spot size is the transducer elevation amplified by the high angle of incidence. Such an arrangement has a focal point of infinity.

Data Processing

Although the wave is defocused across a longer area (in the longitudinal direction) than focused waves in the related art, the present system, after data processing, is capable of higher resolution imaging and feature detection. This is achieved through cross-correlation and coherent summation which removes gaussian noise and reinforces real reflections. In a simplified numerical example: the deployment speed of CT is 9 m/min (150 mm/s); frame rate is 10 FPS (0.1 s/frame); and the sonified area is 60 mm. Thus, the CT advances 15 mm/frame and each feature is captured 4 times (60 mm/15 mm/frame) by each transducer array.

Figure 8B:
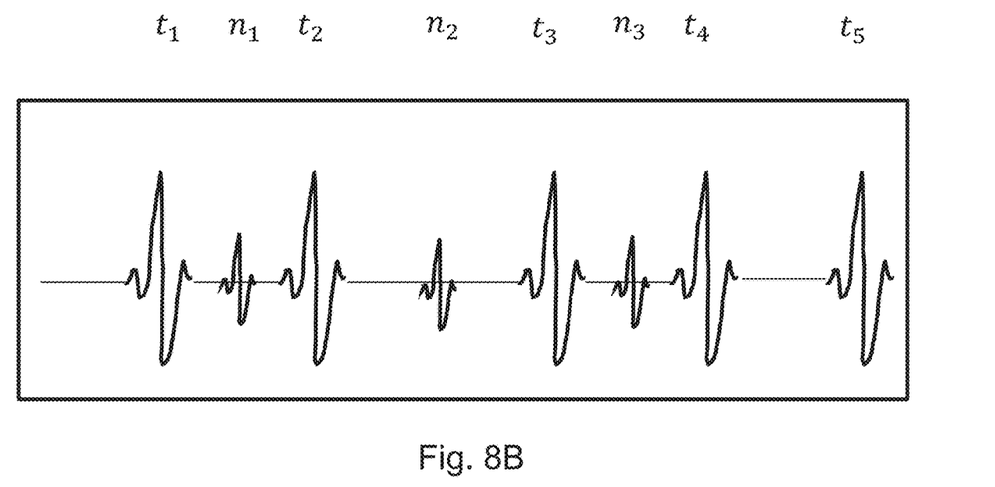
FIG. 8B is a graph of signals in time, corresponding to the reflections in FIG. 6A
Figure 8C:
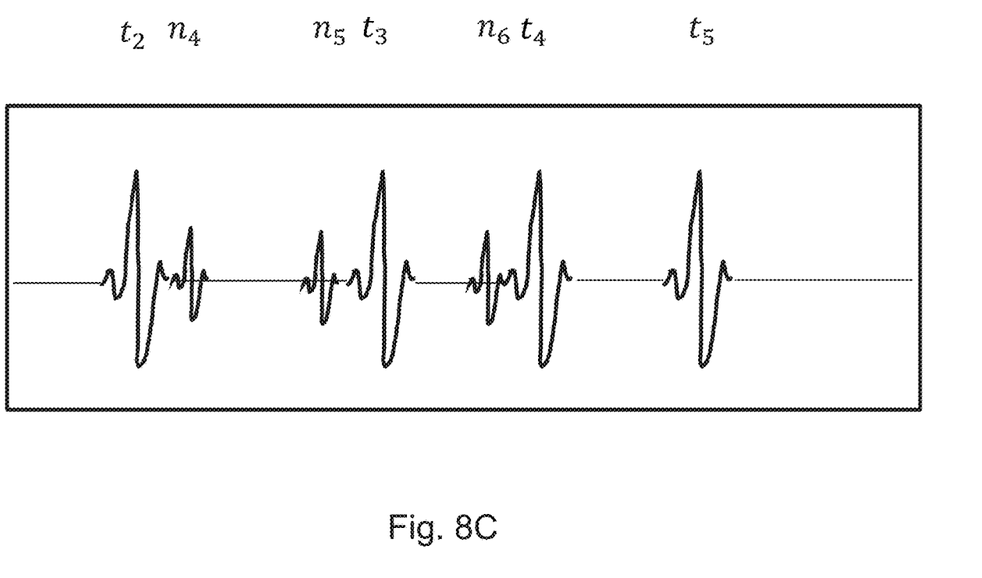
FIG. 8C is a graph of signals of features at a subsequent frame.
Figure 8D:
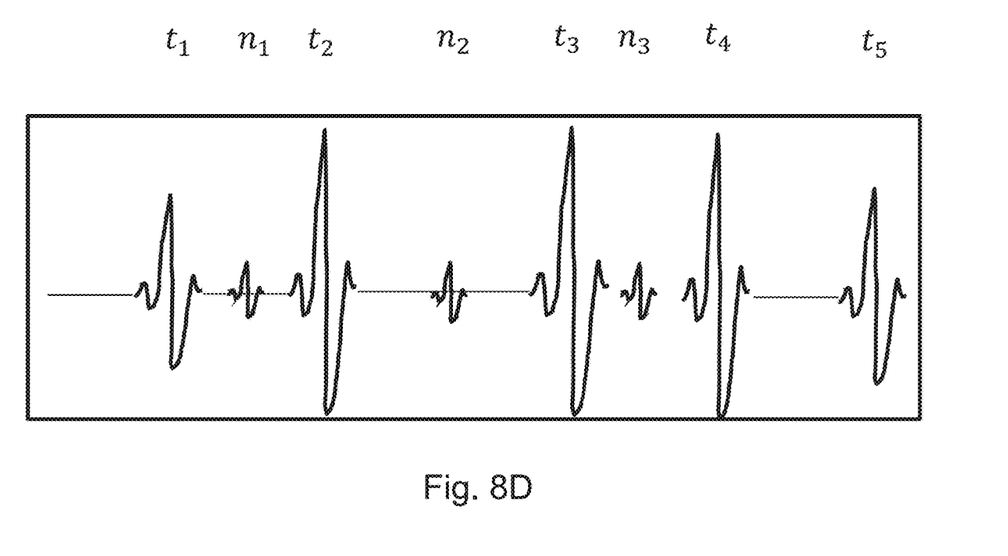
FIG. 8D is a graph of shifted and combined signals.

One advantage of this system is that the large area captured enables a given feature to be observed by the same scan line over multiple frames, where the frames are separated by the inverse of the frame rate. Conversely, Gaussian noises do not repeat in each frame. That is, the system redundantly captures features by partly overlapping the sonified areas in plural subsequent frames. The processor compares two or more frames by shifting the signals in time. The amount of shift is proportional to the logging speed of the tool. The time-shifted signals of plural frames are summed, which has the effect of reinforcing the signals of real reflections that appear in plural frames and cancelling noise that appears in only one frame. FIGS. 8B and 8C shows signals from the same scan line, time separated by a ¼ frame period. In FIG. 8D, the signals are time-shifted back by that ¼ frame period and summed in amplitude. Redundantly captured features 2, 3, 4 are thus doubled and noises n1-n6 may be filtered out (using absolute amplitude threshold Th). Increasing the number of overlapping frames will further increase the signal of real features. A cross-correlation or least square errors approach may be used to find the time-shift that returns optimum coherence. It will be appreciated that the signals to be shifted may be shifted in time or position, as they are equivalent via the time-of-flight conversion.

Registration and Depth

In the present system, the processor may use multiple frames to determine and output a registration of features, that is the relative or absolute location of surface features along the CT. The shifted and summed (or averaged) signals across multiple consecutive frames may be converted to location data to know where defects exist along the surface of the CT. To create a 2D outer surface model, adjacent scan lines are stitched together.

Multiple features are seen in a single frame. The processor may use trigonometry and Time of Flight conversion to determine the spatial separation of any two features. Moreover, a single feature is seen redundantly in two or more overlapping sonified areas. The processor uses the amount of shift needed to coherently sum frames in order to determine how much the CT actually moved between frames or how far offset the features in one frame are from the previous frame. Repeating these calculations, the processor is able to build up the axial registration of all features to determine instantaneous speeds of the CT. These speeds may be integrated to determine length of CT deployed, which corresponds to depth of the tool.

Using Spaced Apart Array

As demonstrated above, it is possible to determine instantaneous speed from a single array. However, this arrangement provides limited accuracy since the measurement error (on the order of 1 sample) is large compared to the total size of the image. FIG. 5 provides a graph of maximum error that is predicted over a deployment of 3000 m of CT. For the single array case (zero spacing), the accumulation of these missed registrations leads to an error of 1.6 m (albeit less than with current wheel encoder systems).

When at least two arrays are used and spaced-apart axially they still redundantly capture surface features on the CT, which features are seen to shift after processing. However, the separation allows very fast movements to be ignored to reduce the overall error. As shown in the graph, a spacing of about 7-15 cm is optimal for the described arrangement. As the separation increases, the error gradually increases as the instantaneous speed changes between repeat captures are averaged out and thus lost.

Figure 6:
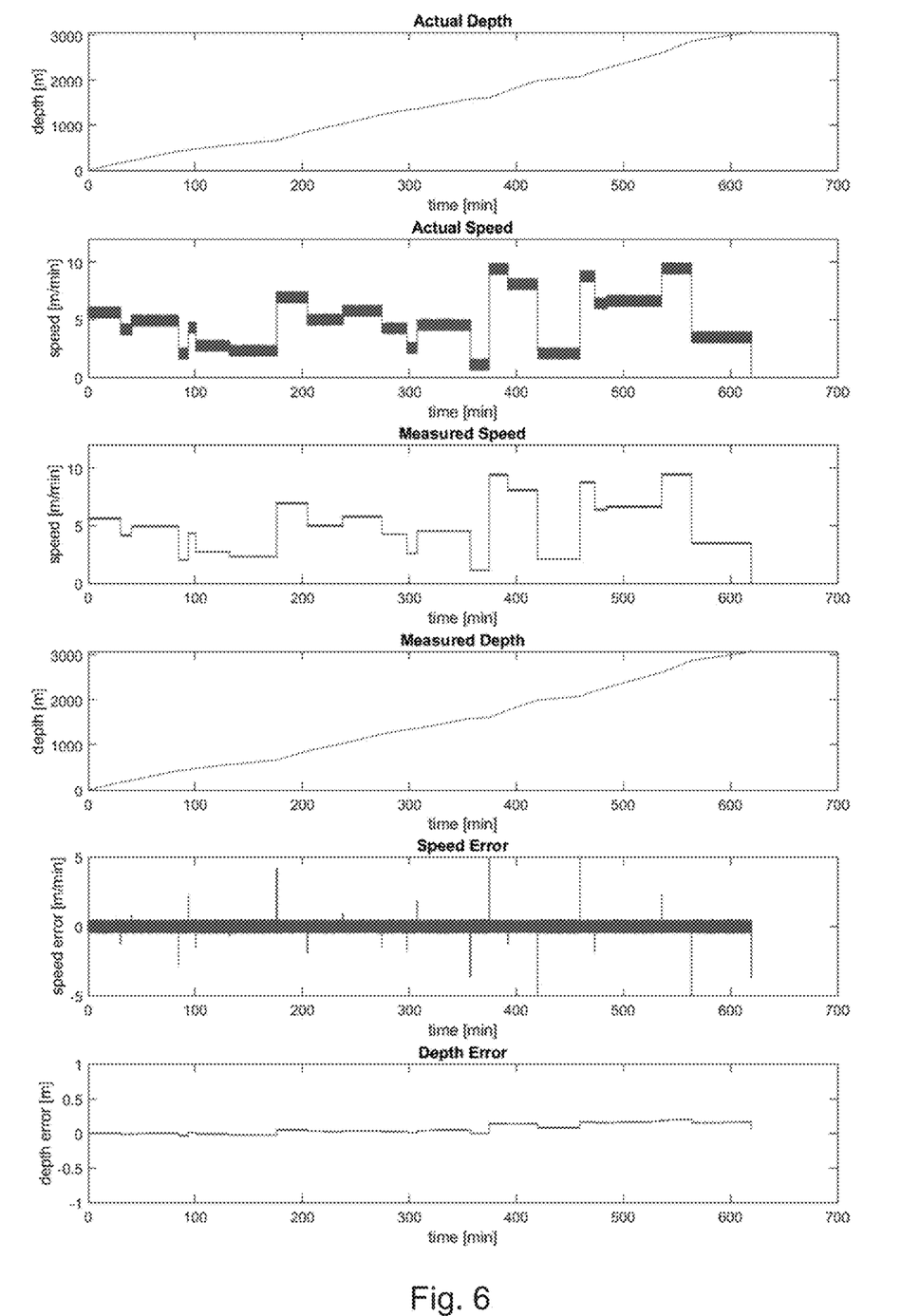
FIG. 6 is a series of graphs of simulated depth and speed data, thereafter processed using the present method to measure speed and depth.

FIG. 6 provides several graphs to illustrate the ability to estimate speed and depth from CT deployed with speed variations and noise. The top shows the actual depth of the tool over the total deployment time of 600 minutes. While the movement appears smooth, the next graph shows that the actual speed was fluctuating, with both large step changes and high frequency changes.

The measured speed using the optimized separation of two arrays ignored the high frequency changes in the third graph. These instantaneous speeds were integrated over time to measure the depth of the tool. Speed changes that could not be captured due to limits in pixel resolution, signal sampling limits, and autocorrelation errors lead to positive and negative errors in speed and thus depth estimates.

Terms such as "top," "bottom," "distal," "proximate," "downhole," "uphole," "below," "above," "upper," and "downstream," are used herein for simplicity in describing relative positioning of elements of the conduit or device, as depicted in the drawings or with reference to the surface datum. Although the present disclosure has been described and illustrated with respect to various embodiments and various uses thereof, it is not to be so limited since modifications and changes can be made therein which are within the full, intended scope of the disclosure as understood by those skilled in the art.

The invention claimed is:

1. A method of operating coiled tubing (CT) at a wellsite, comprising:
    providing an imaging device having at least two ultrasound arrays axially spaced-apart and facing radially-inward towards the CT;
    running the CT through a cavity in the imaging device and into a wellbore;
    capturing a first image of the CT with a first of the at least two ultrasound arrays;
    capturing a second image of the CT with a second of the at least two ultrasound arrays at a later time than the first image;
    comparing the first image and the second image to determine an amount of shift of identical features in the first image and the second image and estimate an amount of movement of the CT through the imaging device.

2. The method of claim 1, further comprising processing the image and the second image to identify damage to a surface of the CT.

3. The method of claim 1, further comprising creating a seal between the CT and an opening in the imaging device to reduce leakage of coupling fluid from the cavity.

4. An imaging device for imaging coiled tubing (CT), comprising:
a housing having two openings at opposing ends and a cavity therebetween, the opening and the cavity being arranged to axially accommodate and pass through a length of coiled tubing;
at least two radial ultrasound arrays facing radially-inward towards the cavity, wherein the at least two radial ultrasound arrays are axially spaced-apart from each other along the cavity; and
a processor programmed to compare first and second images generated by the at least two radial ultrasound arrays to determine an amount of shift of same features in the first image and the second image and estimate an amount of movement of the CT through the imaging device.

5. The imaging device of claim 4, wherein the at least two radial ultrasound arrays further comprise a third radial array facing radially-inwards towards the cavity and perpendicular to the longitudinal axis of the cavity.

6. The imaging device of claim 5, wherein the at least two radial ultrasound arrays are phased arrays, and the imaging device further comprises a driving circuit for beam steering elements of the third radial array such that a beam thereof is angled off center relative to the surface of the coiled tubing for detecting axial cracks.

7. The device of claim 4, wherein the at least two radial ultrasound arrays are phased arrays, and the imaging device further comprises a driving circuit for beam steering elements of the at least two radial ultrasound arrays towards the CT.

8. The device of claim 4, wherein at least one of the openings comprises sealing means for engaging a surface of the coiled tubing to reduce leakage of coupling fluid from the cavity.

9. The device of claim 4, wherein the processor is further configured to process the first image and the second image to identify damage on the coiled tubing.

10. An imaging device for imaging coiled tubing (CT), comprising:
a housing having two openings at opposing ends and a cavity therebetween, the opening and the cavity being arranged to axially accommodate and pass through a length of coiled tubing;
a radial ultrasound array facing radially-inward towards the cavity and divergently focused at the surface of the CT; and
a processor programmed to:
capture a first image of the CT with the ultrasound array in a first frame;
capture a second image of the CT with the ultrasound array at a subsequent frame, wherein the first image and the second image are partly overlapping; and
compare the first image and the second image to determine an amount of shift of the same features in the first image and the second image, and estimate an amount of movement of the CT through the imaging device.

11. The imaging device of claim 10, wherein the radial ultrasound array comprises phased arrays, and the imaging device further comprises a driving circuit for beam steering elements of at least one of the phased arrays such that beam is angled off center relative to the surface of the coiled tubing for detecting axial cracks.

12. The imaging device of claim 10, wherein the processor is further configured to process the first image and the second image to identify damage on the coiled tubing.

13. The imaging device of claim 10, wherein the radial ultrasound array has 256 to 1024 scan lines, operates at 5 MHz, and has a frame rate of 50-200 frames per second (fps).

14. The imaging device of claim 13, wherein the frame rate is 150-200 frames per second (fps).

15. The imaging device of claim 10, wherein the radial ultrasound array comprises a plurality of transducer elements, wherein the transducer elements are positioned radially inward and axially to create a predetermined angle of incidence of 20° to 70°.

16. The imaging device of claim 10, wherein the radial ultrasound array comprises a plurality of transducer elements, wherein the transducer elements are positioned radially inward and axially to create a predetermined angle of incidence of 50° to 70°.

17. The imaging device of claim 10, wherein the processor is further configured to determine a spatial separation of two features identified in the first image and the second image using trigonometry and time-of-flight conversion.

18. The imaging device of claim 10, wherein the imaging device is integral with at least one of a stripper and an injector head.

19. The imaging device of claim 10, wherein the radial ultrasound array comprises a plurality of piezoelectric transducer elements.

20. The imaging device of claim 10, wherein the processor is further configured to generate an axial registration of the same features and determine an instantaneous speed of the coiled tubing using the axial registration of the same features.

* * * * *